United States Patent
Saito

(10) Patent No.: US 6,826,189 B1
(45) Date of Patent: Nov. 30, 2004

(54) ATM SWITCH

(75) Inventor: Toshitada Saito, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 705 days.

(21) Appl. No.: 09/669,551

(22) Filed: Sep. 26, 2000

(30) Foreign Application Priority Data

Sep. 27, 1999 (JP) .......................................... 11-273064

(51) Int. Cl.[7] .............................................. H04L 12/28
(52) U.S. Cl. ....................... 370/397; 370/399; 370/392; 370/400
(58) Field of Search ................................ 370/230–235, 370/395.1, 395.2, 395.3, 395.31, 395.4, 399, 412, 397, 401, 466, 392, 400

(56) References Cited

U.S. PATENT DOCUMENTS

| | | | | |
|---|---|---|---|---|
| 5,592,476 A | * | 1/1997 | Calamvokis et al. | 370/390 |
| 6,233,243 B1 | * | 5/2001 | Ganmukhi et al. | 370/412 |
| 6,243,381 B1 | * | 6/2001 | Cai et al. | 370/392 |
| 6,272,109 B1 | * | 8/2001 | Pei et al. | 370/230 |
| 6,359,884 B1 | * | 3/2002 | Vincent | 370/389 |
| 6,510,158 B1 | * | 1/2003 | Robotham et al. | 370/399 |
| 6,560,230 B1 | * | 5/2003 | Li et al. | 370/395.42 |
| 6,611,519 B1 | * | 8/2003 | Howe | 370/386 |
| 6,618,378 B1 | * | 9/2003 | Giroux et al. | 370/395.1 |
| 6,643,293 B1 | * | 11/2003 | Carr et al. | 370/399 |

FOREIGN PATENT DOCUMENTS

| | | |
|---|---|---|
| JP | 11-68766 | 3/1999 |

OTHER PUBLICATIONS

Schmid et al, "Impact of VC Merging on Buffer Requirements in ATM Networks", pp–1–15.*

* cited by examiner

*Primary Examiner*—John Pezzlo
*Assistant Examiner*—Alan V. Nguyen
(74) *Attorney, Agent, or Firm*—Finnegan, Henderson, Farabow, Garrett & Dunner, L.L.P.

(57) ABSTRACT

A virtual connection queue (VCQx) and a packet queue (PQ) are provided in an ATM switch (20). In the virtual connection queue (VCQx), arriving ATM cells are stored for each virtual connection (VCx). In the packet queue (PQ), at the time where the final ATM cell forming a packet is stored in the virtual connection queue (VCQx), an identifier of the virtual connection (VCx) is stored. A scheduler (26) scans the packet queue (PQ), and based on the identifier in storage of the packet queue (PQ), it selects a virtual connection queue (VCQx) and successively dispatches ATM cells forming a packet in storage of the selected virtual connection queue VCQx. As a result, address space for identifying virtual connections in an ATM network can be used effectively.

4 Claims, 15 Drawing Sheets

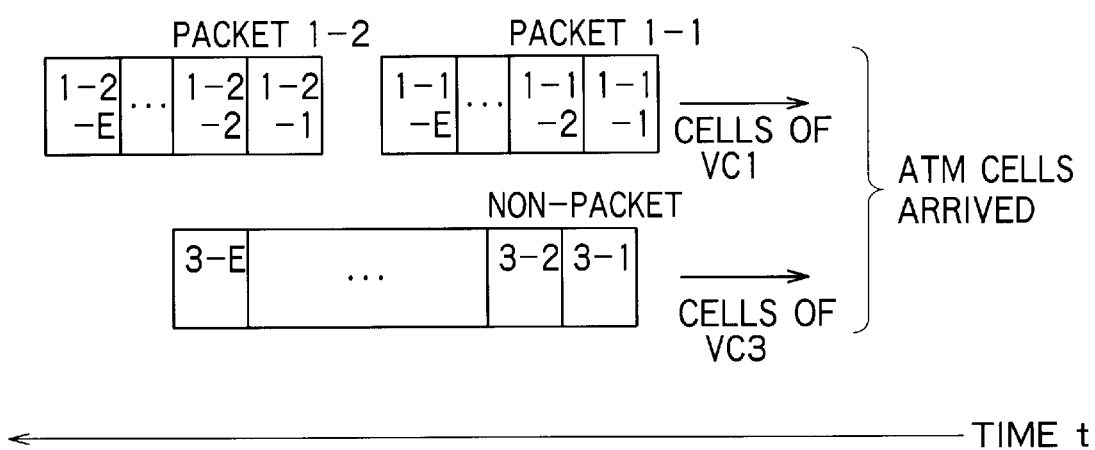
F I G. 11

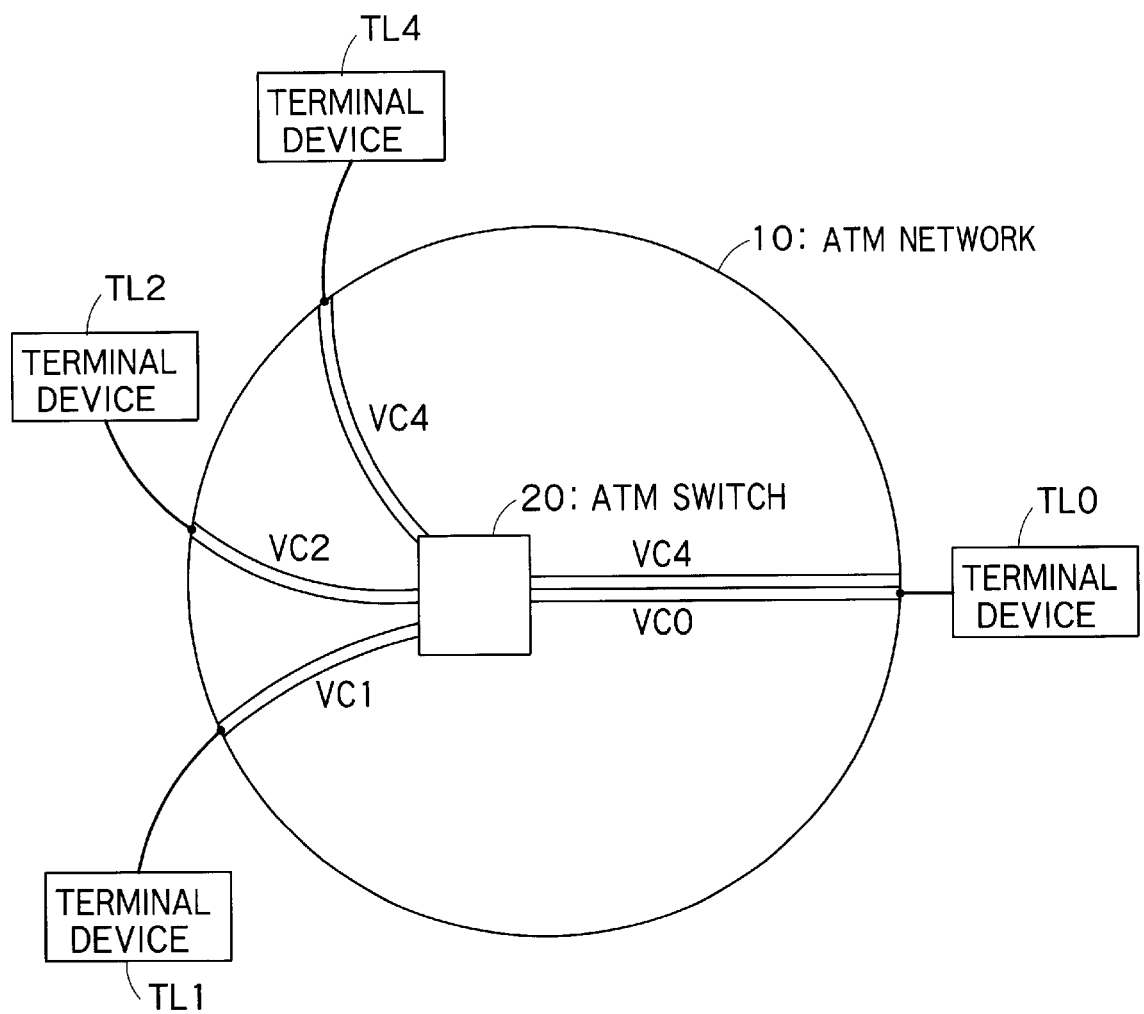
F I G. 16

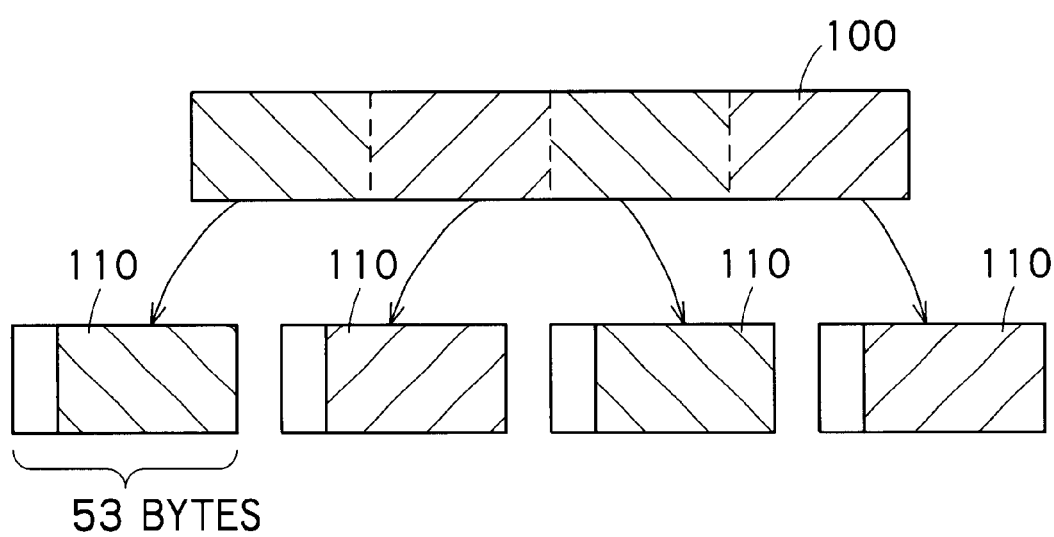
F I G. 20

ATM SWITCH

RELATED APPLICATION

This application claims the benefit of priority under 35 U.S.C. § 119 of Japanese Patent Application No. H11-273064, filed on Sep. 27, 1999.

BACKGROUND OF THE INVENTION

1. Field of the Invention

This invention relates to an ATM (asynchronous transfer mode) switch, and more particularly, to an ATM switch suitable for realizing a connectionless communication system in an ATM network.

2. Description of the Related Art

An ATM network using an ATM switch is a connection-oriented network. That is, An ATM switch is a network configured to previously set a virtual connection (line) for communication.

Therefore, in an ATM network, even when a communication of a type not previously setting a virtual connection is used, it is necessary to set a virtual connection (line) therefore, and a large number of lines must be set. A typical example of communication not previously setting a virtual connection (line) is IP (Internet Protocol) communication.

However, as users of an ATM communication network increase, virtual connections (lines) also increase. Since specification of ATM switches is fixed assuming that virtual connections (lines) are set and released whenever necessary, when a large number of virtual connections (lines) are set in an ATM network, the address space for identifying virtual connections may come to be insufficient for accommodating connectionless communications.

In order to prevent that an enormous number of virtual connections are set in an ATM network, conventional ATM communication networks relied on merger of virtual connections using SAR (segmentation and reassembly) devices for transmission of ATM cells, which are packet-format.

More specifically, as shown in FIG. 20, a packet 100 dealt with in an upper layer protocol of ATM networks, such as IP communication, for example, is divided into a plurality of ATM cells 110 of 53 bytes when transmitted on an ATM network. When a plurality of virtual connections are merged, it must be ensured that divisional ATM cells 110 of the packet 100 do not mix up and can be reproduced into the packet 100 at the terminal device (node) of a destination.

Conventional ATM switches, however, did not have the function of merging virtual connections, and relied on the use of a SAR device as a logical terminal point of a virtual connection (line) to merge virtual connections.

This SAR device was located outside an ATM network, and configured to reconstruct ATM cells of a packet sent by different virtual connections thereby to merge the virtual connection, and thereafter send them again as ATM cells to the ATM communication network by using the SAR device.

This system, however, involved the problem that the communication capacity of virtual connections that could be merged was limited by the processing capability of the SAR device, and the ATM switch could not sufficiently perform its own switching capacity.

Moreover, such a SAR device also had certain functions other than the function of stockpiling and switching packets. However, since the function required for merging virtual connections was only the function of stockpiling and switching these packets, it was not necessary to use the SAR device. That is, the use of a SAR device was fruitless in the specification of the ATM switch.

SUMMARY OF THE INVENTION

It is therefore an object of the invention to provide an ATM switch having the function of merging of virtual connections. Accordingly, it is another object of the invention to relax restrictions on the switching performance caused by the use of a SAR device and ensure sufficient performance of the switching ability an ATM network originally has.

In order to accomplish the aforementioned and other objects, according to one aspect of the present invention, an ATM switch transmitting ATM cells arrived through a plurality of different virtual connections by merging them into a single virtual connection, comprising:

virtual connection queues which store the ATM cells classified according to the individual virtual connections;

one or more packet queues which store an identifier of the virtual connection used for the transmission of the ATM cells for forming a packet, when a final ATM cell of the packet arrives; and a scheduler configured to scan the packet queues, extract one identifier from the packet queue storing the identifiers, select one of the virtual connection queues to be next transmitted in accordance with the identifier extracted from the packet queue, and successively transmit ATM cells in a unit of packet from the virtual connection queue selected.

According to another aspect of the present invention, a control method of an ATM switch transmitting ATM cells, comprising the steps of:

classifying and storing the ATM cells in virtual connection queues according to virtual connections through which the ATM cells are arrived;

storing an identifier of the virtual connection used for transmission of the ATM cells for forming a packet in one or more packet queues, when a final ATM cell of the packet arrives; and scanning the packet queues, selecting one of the virtual connection queues to be next transmitted in accordance with a storing order of the identifier in the packet queues, and successively transmitting ATM cells in a unit of packet from the virtual connection queue selected to another virtual connection.

BRIEF DESCRIPTION OF THE DRAWINGS

FIG. 11 is a diagram that shows a timing of arrival of ATM cells, which form packets and non-packet, used as an example in the explanation of behaviors of an ATM switch according to the third embodiment of the invention;

FIG. 16 is a diagram that explains an aspect of a setting of virtual connections in an ATM network according to the fifth embodiment of the invention;

FIG. 20 is a diagram that shows an aspect of one packet divided into a plurality of ATM cells.

DETAILED DESCRIPTION OF THE PREFERRED EMBODIMENTS (First Embodiment)

The first embodiment of the invention is directed to managing virtual connection with a common address by merging virtual connections from a plurality of terminal devices (sending nodes) to a common destination terminal device (destination node), thereby to effectively use the address space.

Figure 1:
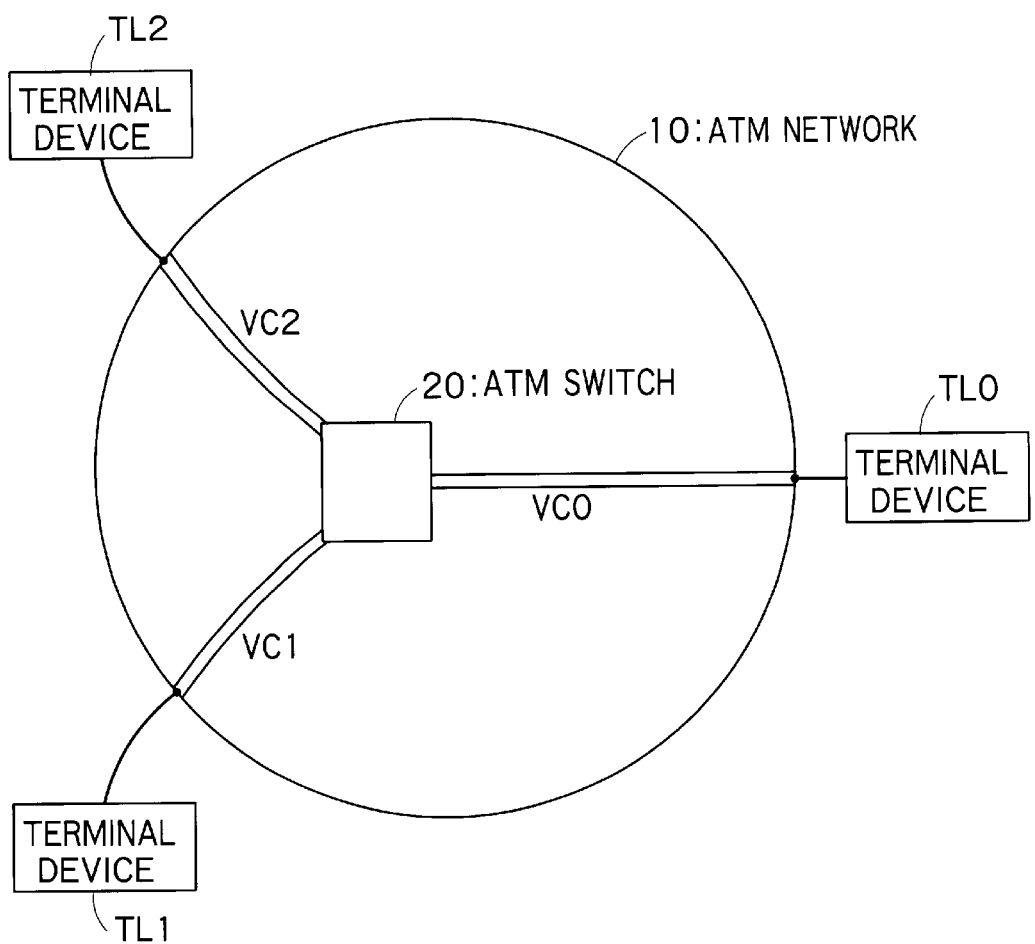
FIG. 1 is a diagram that explains an aspect of a setting of virtual connections in an ATM network according to the first embodiment of the invention.

First referring to FIG. 1, outline of an ATM network using an ATM switch according to the invention is explained below. FIG. 1 is a diagram that shows an ATM network and terminal devices connected to the ATM network.

As shown in FIG. 1, the ATM network 10 includes an ATM switch 20. Although such an ATM network actually has a plurality of ATM switches that are each connected with adjacent one of these ATM switches, respectively, FIG. 1 illustrates one ATM switch 20 for simplicity.

The ATM network 10 is connected to terminal devices TL0, TL1, TL2. Actually, here again, a number of terminal devices are connected to the ATM network 10, but FIG. 1 illustrates only three terminal devices, TL0, TL1, TL2 for simplicity.

Assume here that the terminal device TL1 is sending a packet to the terminal device TL0, and the terminal device TL2 is also sending a packet to the terminal device TL0. For this transmission, a virtual connection VC1 is set between the terminal device TL1 and the ATM switch 20, and a virtual connection VC2 is set between the terminal device TL2 and the ATM switch 20. Additionally, a virtual connection VC0 is set between the ATM switch 20 and the terminal device TL0.

As will be explained later in greater detail, the ATM switch 20 according to the invention has the function of merging two virtual connections VC1 and VC2 into a single virtual connection VC0. Further, the ATM switch 20 has the function of sending ATM cells, which form packets, to the virtual connection VC0 while preventing that ATM cells for forming packets sent by the virtual connection VC1 mix up with ATM cells for forming packets sent by the virtual connection VC2.

Figure 2:
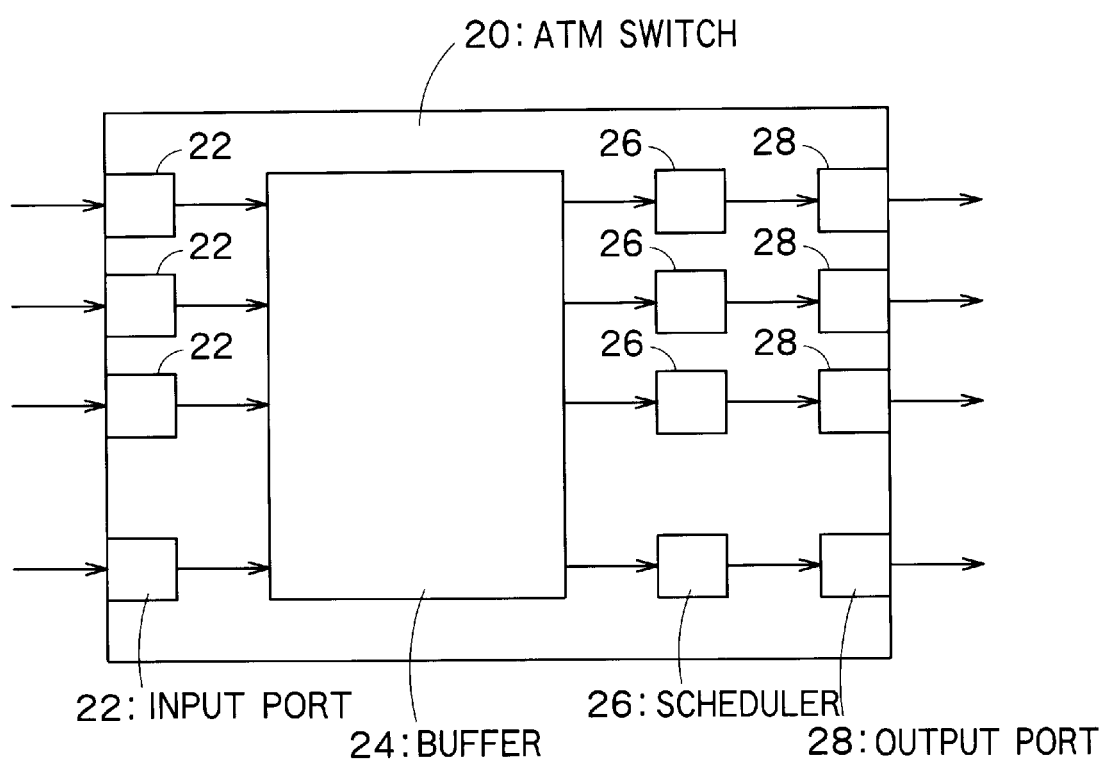
FIG. 2 is a block diagram that shows internal configuration of an ATM switch according to the first embodiment of the invention.

FIG. 2 is a block diagram of internal configuration of the ATM switch 20. As shown in FIG. 2, the ATM switch 20 has input ports 22, a buffer 24, schedulers 26 and output ports 28.

In greater detail, the ATM switch 20 has one or more input ports 22. ATM cells from external input lines arrive at these input ports 22, respectively. Each input port 22 sends out these ATM cells to the buffer 24. The buffer 24 is configured to switch these ATM cells and store them once.

ATM cells stored in the buffer 24 are classified to individual virtual connections by the schedulers 26 and stored therein. Each scheduler 26 is associated with each output port 28. These schedulers 26 are engaged in scheduling of sending cells. That is, the schedulers 26 select ATM cells to be sent out. ATM cells selected by the schedulers 26 are sent out from the output ports 28 to external output lines. Also regarding the output ports 28, the ATM switch 20 has one or more of such output ports 28.

Figure 3:
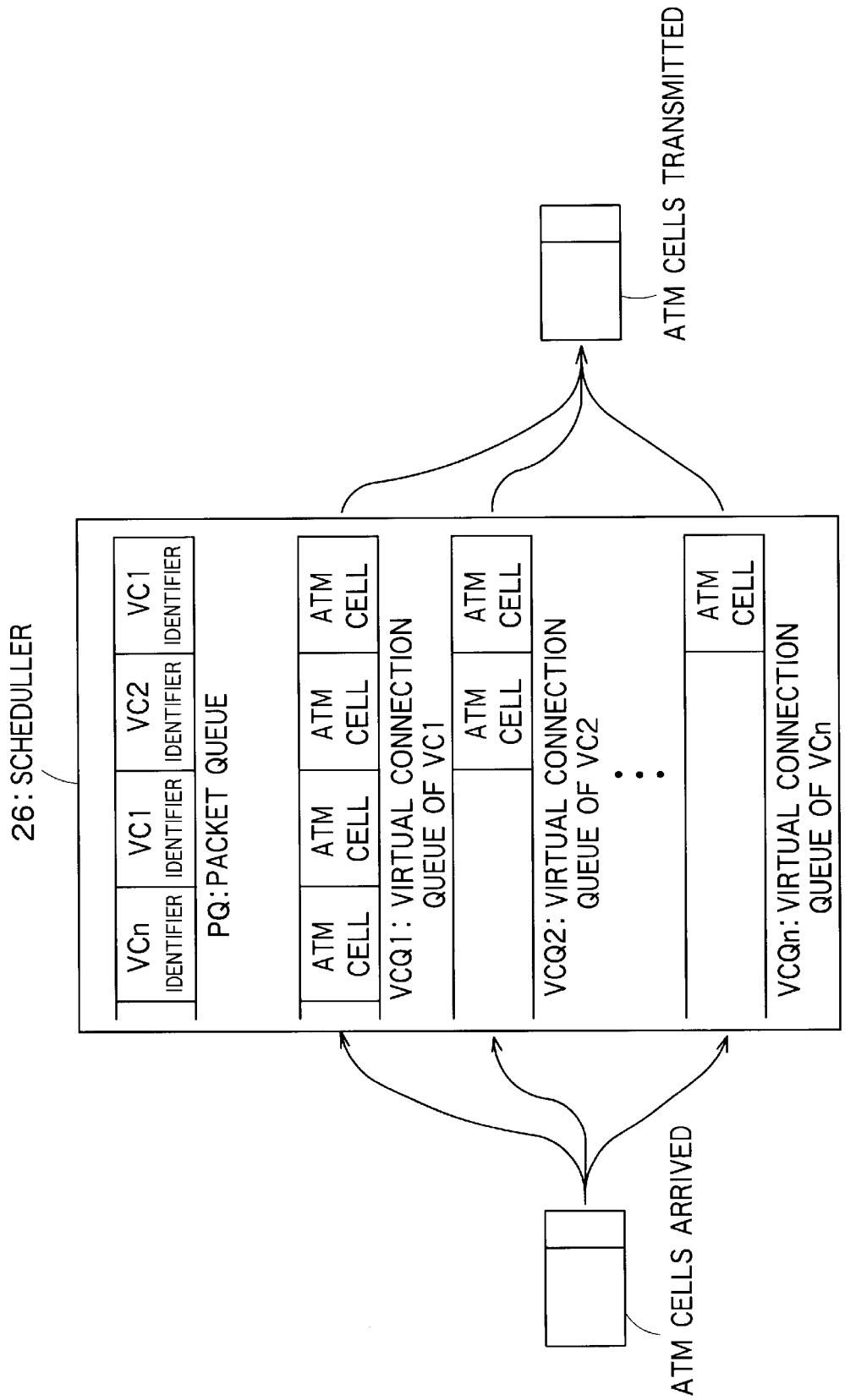
FIG. 3 is a diagram that shows virtual connection queues and a packet queue made inside a scheduler of the ATM switch according to the first embodiment of the invention.

FIG. 3 is a diagram that schematically shows queues made inside the scheduler 26 of the ATM switch 20.

As shown in FIG. 3, the scheduler 26 has virtual connection queues VCQ1 through VCQn for respective virtual connections. That is, it has the virtual connection queue VCQ1 for a virtual connection VC1, the virtual connection queue VCQ2 for a virtual connection VC2, . . . , and the virtual connection queue VCQn for a virtual connection VCn. Stored in the virtual connection queue VCQ1 are ATM cells having reached by using the virtual connection VC1. Stored in the virtual connection queue VCQ2 are ATM cells having reached by using the virtual connection VC2. Then, stored in the virtual connection queue VCQn are ATM cells having reached by using the virtual connection VCn.

The scheduler 26 has a packet queue PQ as well. The packet queue PQ is one for managing to transmit ATM cells in the unit of a packet. The packet queue PQ stores identifiers, each of which indicate a virtual connection queue waiting for their dispatch.

Next explained is outline of behaviors of the scheduler 26. First, when ATM cells, which constitute a packet, are sent to a certain virtual connection VCx, a virtual connection queues VCQx sequentially stores the ATM cells. The suffix "x" represents an arbitrary virtual connection and an arbitrary virtual connection queue.

In this manner, ATM cells that make up packets are sequentially stored in the virtual connection queue VCQx, and when the final ATM cell of each packet arrives, this ATM cell is stored in the virtual connection queue VCQx, and the identifier of the virtual connection VCx is stored in the packet queue PQ.

The scheduler 26 scans the packet queue PQ and selects a virtual connection VCx to be dispatched by extracting its identifier stored in the forefront of the packet queue PQ. Then the scheduler 26 consecutively takes out ATM cells of one packet from the forefront of the virtual connection queue VCQx corresponding to the selected virtual connection VCx, and sends them out to the output port 28 (see FIG. 2). At the time when the final ATM cell of the packet is sent out from the virtual connection queue VCQx, the transmission of this packet is completed. The scheduler 26 again scans the packet queue PQ for selecting the packet to be next transmitted, and repeats these processes thereafter.

Figure 4:
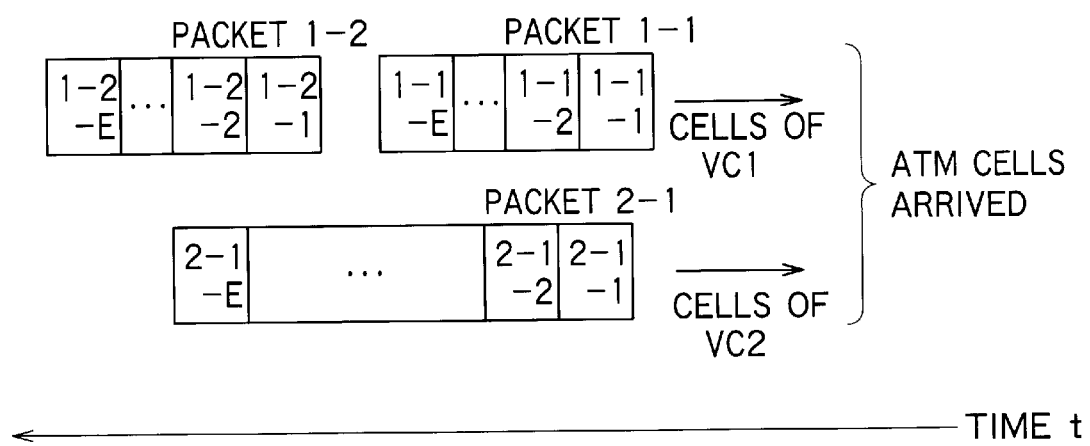
FIG. 4 is a diagram that shows a timing of arrival of ATM cells, which form packets, used as an example in the explanation of behaviors of the ATM switch according to the first embodiment of the invention.
Figure 5:
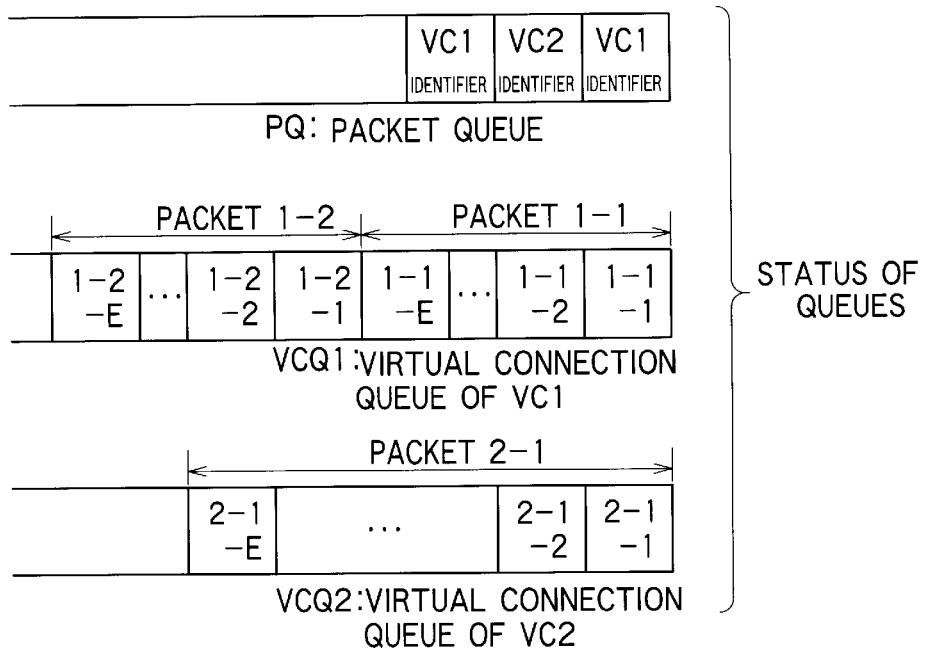
FIG. 5 is a diagram that shows processing of the virtual connection queues and the packet queue upon arrival of ATM cells at the timing shown in FIG. 4.
Figure 6:
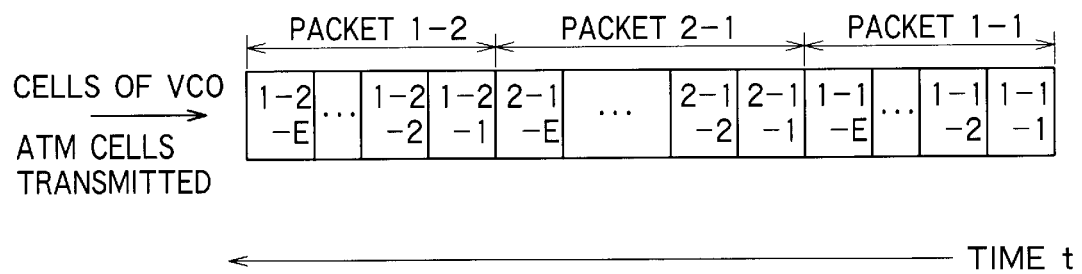
FIG. 6 is a diagram that shows a timing of ATM cells transmitted from a merged virtual connection.

Next referring to FIGS. 4 through 6, the functions of the scheduler 26 are explained in detail by way of a specific example.

FIG. 4 is a diagram showing an exemplary timing of ATM cells arriving at the ATM switch 20. FIG. 5 is a diagram showing an aspect of management for storage of ATM cells in the scheduler in the case of FIG. 4. FIG. 6 is a diagram showing a timing of ATM cells transmitted from the ATM switch 20. Assume here that the setting of virtual connections in this explanation is in the status shown in FIG. 1 already explained.

As shown in FIG. 4, in the virtual connection VC1, an ATM cell 1-1-1 first arrives at the ATM switch 20. Successively, in the virtual connection VC2, an ATM cell 2-1-1 arrives. In this manner, sequentially, ATM cells 1-1-2, et seq. arrive sequentially in the virtual connection VC1, and ATM cells 2-1-2, et seq. arrive sequentially in the virtual connection VC2.

In the example of FIG. 4, a packet 1-1 transmitted via the virtual connection VC1 is composed of ATM cells 1-1-1 through 1-1-E, and a packet 1-2 is composed of ATM cells 1-2-1 through 1-2-E. A packet 2-1 transmitted via the virtual connection VC2 is composed of ATM cells 2-1-1 through 2-1-E.

In the case where ATM cells arrive at the timing shown in FIG. 4, the processing shown in FIG. 5 is executed in the scheduler 26.

Since the ATM cell 1-1-1 first arrives through the virtual connection VC1, this ATM cell 1-1-1 is stored in the virtual connection queue VCQ1. Next, since the ATM cell 2-1-1 arrives through the virtual connection VC2, this ATM cell 2-1-1 is stored in the virtual connection queue VCQ2. Successively, since the ATM cell 1-1-2 arrives through the virtual connection VC1, this ATM cell 1-1-2 is stored in the virtual connection queue VCQ1. In this manner, for respective virtual connections VC1 and VC2, arriving ATM cells are classified and stored in the virtual connection queues VCQ1 and VCQ2, respectively.

After such steps are repeated, at the time of arrival of the final ATM cell 1-1-E of the packet 1-1 from the virtual connection VC1, the ATM cell 1-1-E is stored in the virtual connection queue VCQ1, and the identifier of the virtual connection VC1 is stored in the packet queue PQ.

Subsequently, the next packet 1-2 is transmitted from the virtual connection VC1, and its ATM cells are sequentially stored in the virtual connection queue VCQ1 from the ATM cell 1-2-1.

Similarly, at the time of arrival of the final ATM cell 2-1-E of the packet 2-1 from the virtual connection VC2, this ATM cell 2-1-E is stored in the virtual connection queue VCQ2, and the identifier of the virtual connection VC2 is stored in the packet queue PQ.

Then, at the time of arrival of the final ATM cell 1-2-E of the packet 1-2 from the virtual connection VC1, the ATM cell 1-2-E is stored in the virtual connection queue VCQ1, and the identifier of the virtual connection VC1 is stored in the packet queue PQ.

As shown in FIG. 5, the arrived ATM cells are managed in the scheduler 26, and they are dispatched at the timing shown in FIG. 6 from the virtual connection VC0.

That is, the scheduler 26 scans the packet queue PQ, and takes out the identifier of the first virtual connection VC1. The scheduler 26 successively transmits ATM cells forming one packet, ATM cells being stored in the virtual connection queue VCQ1 corresponding to the virtual connection VC1 specified by the extracted identifier, via the virtual connection VC0. That is, it sequentially sends out ATM cells 1-1-1 through 1-1-E forming the packet 1-1 stored in the virtual connection queue VCQ1 in the virtual connection VC0 to an external line. ATM cells stored in the virtual connection queue VCQ1 are erased one after another immediately after being sent out.

Upon completion of the transmission of this packet, the identifier of the virtual connection VC1 in the storage at the forefront of the packet queue PQ is removed. However, the timing for removal of this identifier is not limited to that time. Instead, it may be the time at which the scheduler 26 extracts the identifier from the packet queue PQ, for example.

Upon completion of the transmission of this packet 1-1, the scheduler 26 again scans the packet queue PQ and extracts the identifier of the virtual connection VC2. Then, it sequentially extracts the ATM cells 2-1-1 through 2-1-E forming the packet 2-1 from the virtual connection queue VCQ2 corresponding to the virtual connection VC2, and sequentially sends out them in the virtual connection VC0.

After that, the scheduler 26 scans the packet queue PQ and extracts the identifier of the virtual connection VC1. Then it sequentially extracts the ATM cells 1-2-1 through 1-2-E forming the packet 1-2 from the virtual connection queue VCQ1 corresponding to the virtual connection VC1, and successively sends out them in the virtual connection VC0.

As explained above, according to the ATM switch 20 of this embodiment, ATM cells to be transmitted are scheduled and controlled in the unit of each packet. Therefore, even when the virtual connection VC1 and the virtual connection VC2 are merged as the virtual connection VC0, ATM cells are prevented from mixing up between different packets.

More specifically, ATM cells arrived by using the virtual connections VC1, VC2 are sequentially stored in the virtual connection queues VCQ1, VCQ2, respectively. Then, when consecutive ATM cells form one packet, the identifier of a virtual connection VCx, of which ATM cells forming one packet already arrive, is stored in the packet queue PQ. The scheduler 26 associated with each output port 28 selects ATM cells to be next transmitted, on the basis of the packet queue PQ. That is, it selects the virtual connection queue VCQx to be next transmitted from the virtual connection VC0, according to the identifier stored at the forefront of the packet queue PQ. Thereby, it is possible to store a sequence of ATM cells generated by decomposing packets in virtual connection queues VCQ1, VCQ2 and to transmit them successively from the virtual connection VC0 as a series of ATM cells reconstructing blocks of the packets. Therefore, when a plurality of virtual connections VC1, VC2 are merged into the virtual connection VC0, ATM cells of the packets 1-1, 1-2, 2-1 can be received at a receiver's terminal device TL0 without being mixed.

In this manner, by merging virtual connections in the ATM switch 20, the address space for identifying virtual connections within the ATM network 10 can be used effectively, and even when many users set enormous virtual connections in the ATM network 10, they all can be accommodated. Moreover, since the ATM switch 20 constituting the ATM network 10 has the function of merging virtual connections, it is not necessary to provide the SAR device outside the ATM network like the conventional technique, the hardware resources can be used effectively.

(Second Embodiment)

The second embodiment of the invention is directed to enabling assignment of priorities among different virtual connections by modifying the ATM switch according to the first embodiment to provide a plurality of packet queues different in priority.

Figure 7:
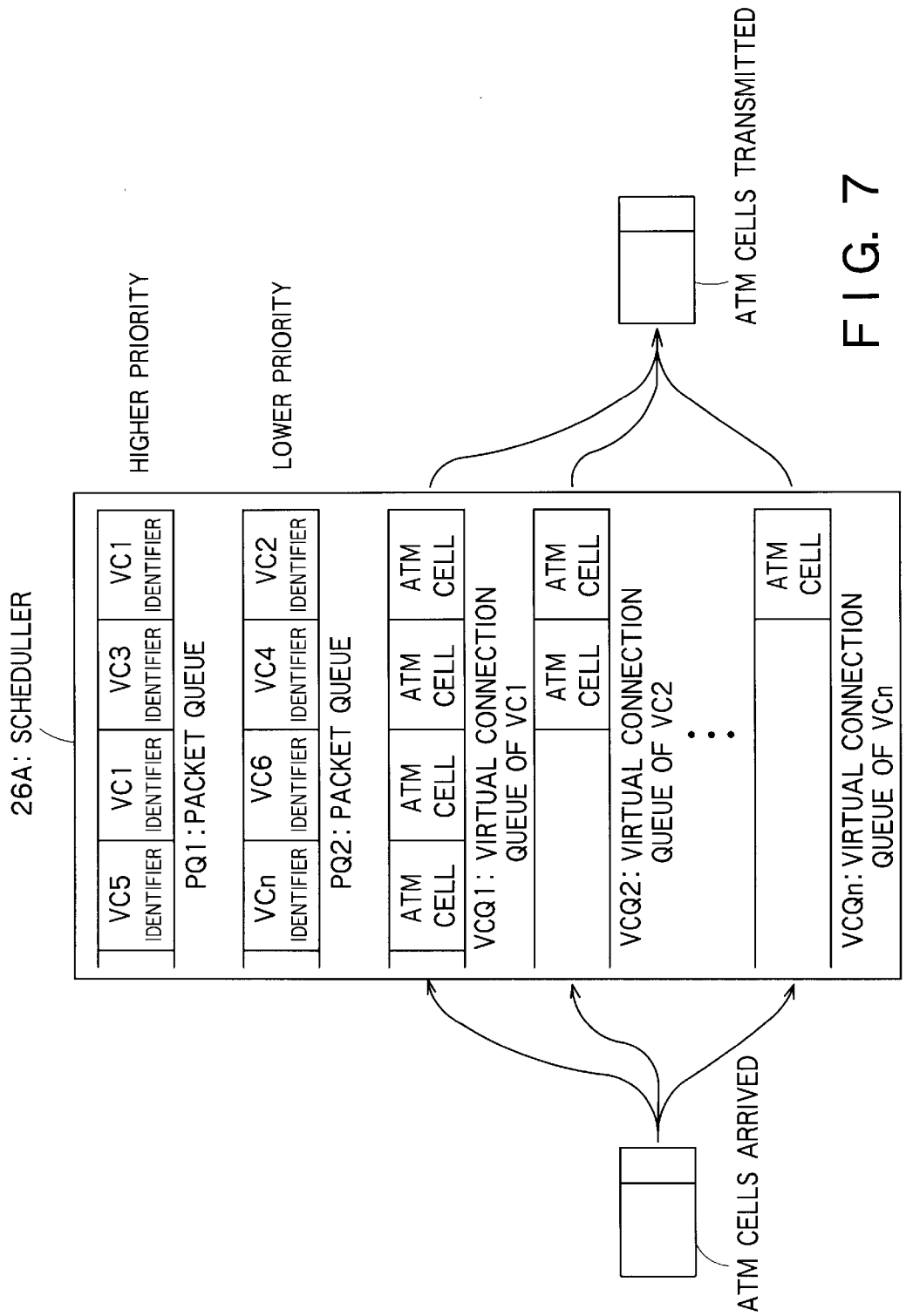
FIG. 7 is a diagram that schematically shows virtual connection queues and packet queues made inside a scheduler in the ATM switch 20.

FIG. 7 is a diagram that schematically shows queues made inside a scheduler 26A in the ATM switch 20.

As shown in FIG. 7, in the scheduler 26A in this embodiment, a plurality of packet queues PQ1 and PQ2 are made. In the example of FIG. 6, the priority of the packet queue PQ1 is higher than that of the packet queue PQ2.

In the packet queue PQ1 having a high priority, at the time where blocks (packets) of ATM cells sent by virtual connections VC1, VC3, VC5 having higher priorities arrive, identifiers of the virtual connections VCx are stored. In the packet queue PQ2 having a lower priority, at the time where blocks (packets) sent by virtual connections VC2, VC4, VC6, VCn having lower priorities arrive, identifiers of the virtual connections VCx are stored.

The scheduler 26A scans a plurality of packet queues PQ1, PQ2 prepared for respective output ports 28 in the order of priorities, and begins to send packets sequentially from the virtual connection VCx with the highest priority. That is, the scheduler 26A first scans the packet queue PQ1 having the higher priority, and if any identifier is stored in this packet queue PQ1, then the scheduler 26A selects the virtual connection queue VCQx from which it should next start to send ATM cells, according to the identifier. If no identifier is stored in the packet queue PQ1 with the higher priority, the scheduler 26A scans the packet queue PQ2 with the lower priority. In this manner, ATM cells of the virtual connections VC1, VC3, VC5 with higher priorities can be sent preferentially to ATM cells of the virtual connections VC2, VC4, VC6, VCn with lower priorities.

Figure 8:
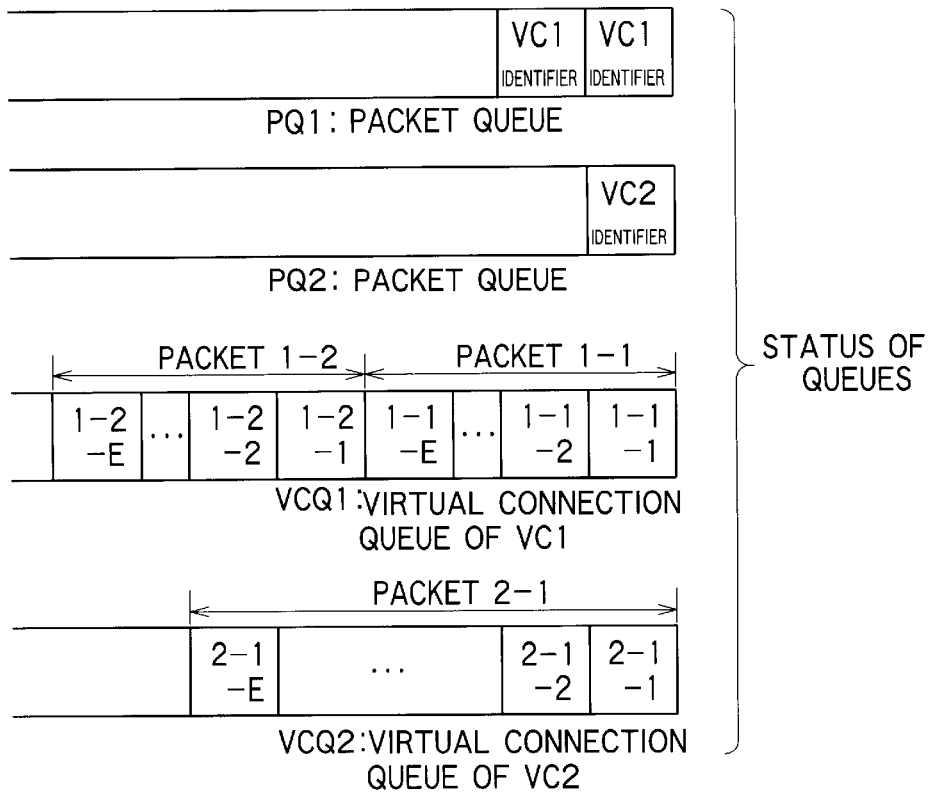
FIG. 8 is a diagram that shows processing of virtual connection queues and packet queues upon arrival of ATM cells at the timing shown in FIG. 4.
Figure 9:
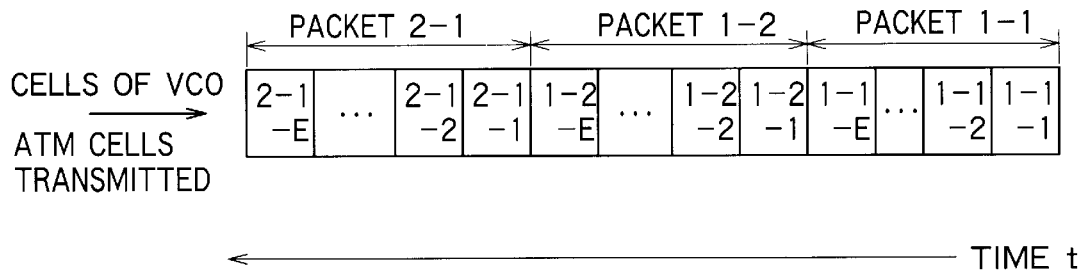
FIG. 9 is a diagram that shows a timing of ATM cells transmitted from a merged virtual connection.

Next referring to FIGS. 8 and 9, behaviors of the scheduler 26A are explained in detail.

FIG. 8 is a diagram that shows an aspect of storage and management of ATM cells in the scheduler 26A upon arrival of ATM cells at the timing shown in FIG. 4 already explained. That is, here is assumed that the arrival timing of ATM cells is the same as the first embodiment. FIG. 9 is a diagram that shows a timing of ATM cells transmitted from the ATM switch 20.

Assume here that the setting of virtual connections in this explanation is in the status shown in FIG. 1 already explained. Also assume that the virtual connection VC1 has a higher priority than the virtual connection VC2.

In the case where ATM cells arrive at the timing as shown in FIG. 4, processing as shown in FIG. 8 is executed in the scheduler 26A.

Since the ATM cell 1-1-1 first arrives through the virtual connection VC1, this ATM cell 1-1-1 is stored in the virtual connection queue VCQ1. Next, since the ATM cell 2-1-1 arrives through the virtual connection VC2, this ATM cell 2-1-1 is stored in the virtual connection queue VCQ2. Successively, since the ATM cell 1-1-2 arrives through the virtual connection VC1, this ATM cell 1-1-2 is stored in the virtual connection queue VCQ1. In this manner, for respective virtual connections VC1 and VC2, arrived ATM cells are classified and stored in the virtual connection queues VCQ1 and VCQ2, respectively.

While such arrived ATM cells are stored sequentially, at the time of arrival of the final ATM cell 1-1-E of the packet 1-1 from the virtual connection VC1, the ATM cell 1-1-E is stored in the virtual connection queue VCQ1, and the identifier of the virtual connection VC1 is stored in the packet queue PQ1 with the higher priority.

Subsequently, the next packet 1-2, from the ATM cell 1-2-1, is transmitted from the virtual connection VC1, and its ATM cells are sequentially stored in the virtual connection queue VCQ1.

Similarly, at the time of arrival of the final ATM cell 2-1-E of the packet 2-1 from the virtual connection VC2, this ATM cell 2-1-E is stored in the virtual connection queue VCQ2, and the identifier of the virtual connection VC2 is stored in the packet queue PQ2 having the lower priority.

At the time of arrival of the final ATM cell 1-2-E of the packet 1-2 from the virtual connection VC1, the ATM cell 1-2-E is stored in the virtual connection queue VCQ1, and the identifier of the virtual connection VC1 is stored in the packet queue PQ1 having the higher priority.

As shown in FIG. 8, arrived ATM cells are managed for storage in the scheduler 26A, and they are sent at the timing shown in FIG. 9 from the virtual connection VC0.

That is, the scheduler 26A first scans the packet queue PQ1 with the higher priority. Since the packet queue PQ1 stores the identifier of the virtual connection VC1, the scheduler 26A extracts it.

Based on the extracted identifier, the scheduler 26A successively sends out ATM cells of one packet in the virtual connection queue VCQ1 in the virtual connection VC0. That is, it sequentially transmits ATM cells 1-1-1 through 1-1-E forming the packet 1-1 stored in the virtual connection queue VCQ1 by using the virtual connection VC0 to an external line. ATM cells 1-1-1 through 1-1-E stored in the virtual connection queue VCQ1 are erased one after another immediately after being sent out.

Upon completion of the transmission of this packet, the identifier of virtual connection VC1, which is stored in the forefront of the packet queue PQ1, is removed. However, the timing for removal of this identifier is not limited to that time. Instead, it may be the time at which the scheduler 26A extracts the identifier from the packet queue PQ1, for example.

Upon completion of the transmission of the packet 1-1, the scheduler 26A again scans the packet queue PQ1 with the higher priority first. Since this packet queue PQ1 stores the identifier of the virtual connection VC1, the scheduler 26A extracts it. Then, it sequentially extracts the ATM cells 1-2-1 through 1-2-E forming the packet 1-2 from the virtual connection queue VCQ1 corresponding to the virtual connection VC2, and sequentially sends out them in the virtual connection VC0.

That is, in the example of FIGS. 8 and 9, the packet 1-2 with the higher priority results in being sent in the virtual connection VC0, getting ahead of the packet 2-1 with the lower priority.

Upon completion of the transmission of the packet 1-2, the scheduler 26A first scans the packet queue PQ1 having the higher priority. However, since this packet queue PQ1 is empty, it next scans the packet queue PQ2 having the lower priority. Since this packet queue PQ2 stores the identifier of the virtual connection VC2, the scheduler 26A extracts it. Then the scheduler 26A sequentially extracts ATM cells 2-1-1 through 2-1-E forming the packet 2-1 from the virtual connection queue VCQ2, and successively sends out them in the virtual connection VC0.

As explained above, according to the ATM switch 20 of this embodiment, ATM cells are scheduled and controlled in the unit of each packet similarly to the first embodiment. Therefore, even when the virtual connection VC1 and the virtual connection VC2 are merged as the virtual connection VC0, ATM cells are prevented from mixing up between different packets.

Moreover, this embodiment prepares a plurality of packet queues PQ1, PQ2 having different priority for each output port 28, so that the scheduler 26A scans packet queues PQ1, PQ2 in the order of priorities. Therefore, virtual connections VC1, VC2 can have priorities among them.

In the embodiment shown here, the scheduler 26A employs a strict priority system as its scheduling algorithm. However, the algorithm is not limited to this. For example, a system like weighted round robin can be also employed as the scheduling algorithm. That is, also usable is the weighted round robin system so designed that, in FIG. 8, when packets of virtual connections VCx specified by identifiers stored in the packet queue PQ1 are sent twice, a packet of a virtual connection VCx specified by an identifier stored in the packet queue PQ2 is sent once. Further, identifies in storage may be extracted alternately from the packet queues PQ1 and PQ2.

(Third Embodiment)

In the ATM network, there are non-packet-format ATM cells that do not form packets, in addition to packet-format ATM cells that form packets. In case of non-packet-format cells, it is not necessary to manage a plurality of ATM cells as one block as explained heretofore, and it is sufficient to manage individual ATM cells discretely. Therefore, the third embodiment of the invention is directed to enabling appropriate storage and management of ATM cells even when both packet-format ATM cells and non-packet-format ATM cells exist. as explained heretofore, and it is sufficient to manage individual ATM cells discretely. Therefore, the third embodiment of the invention is directed to enabling appropriate storage and management of ATM cells even when both packet-format ATM cells and non-packet-format ATM cells exist.

The scheduler 26A in this embodiment shown here is the same as that of the second embodiment shown in FIG. 7. Therefore, its details are not explained here.

Figure 10:
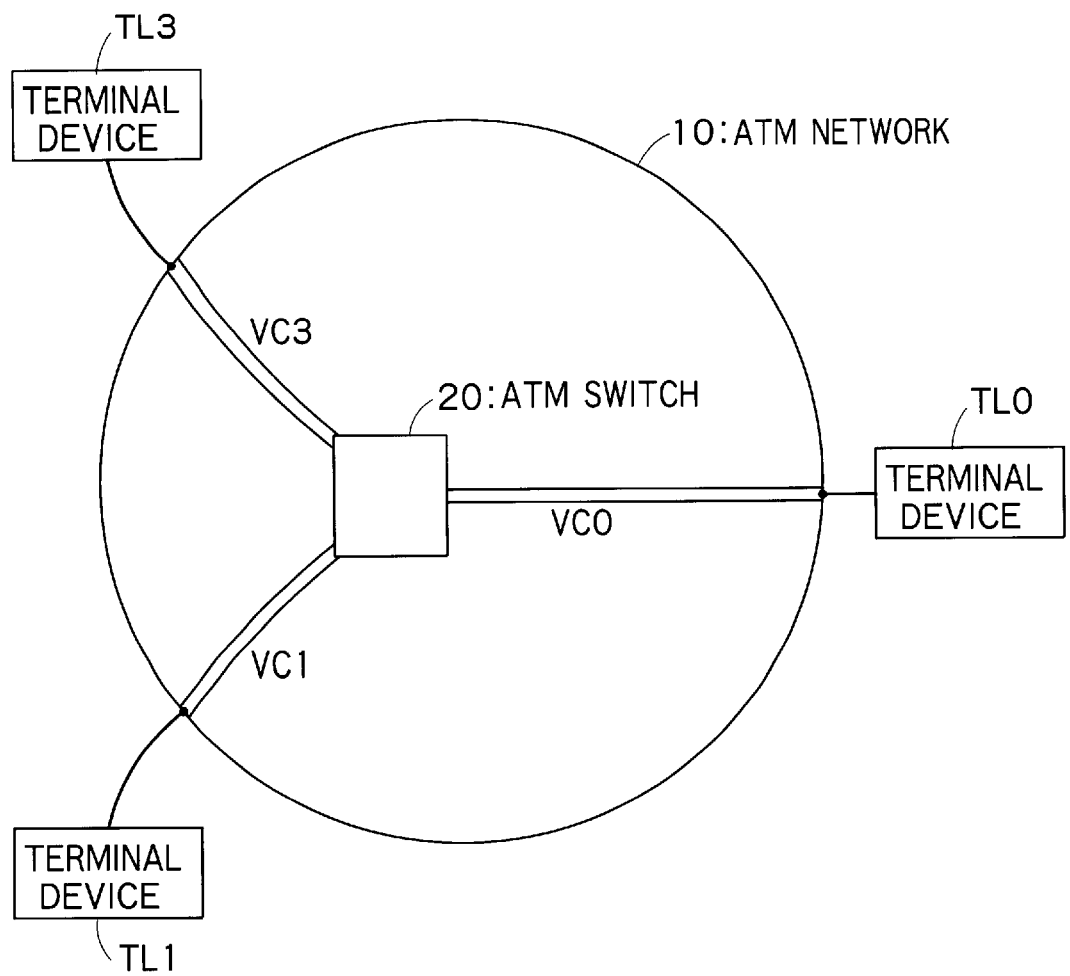
FIG. 10 is a diagram that explains an aspect of a setting of virtual connections in an ATM network according to the third embodiment of the invention.

Further, assume here that virtual connections VC0, VC1, VC3 are set in the ATM network 10 as shown in FIG. 10. That is, for both terminal devices TL1 and TL3, destination of communication is the terminal device TL0. Between the terminal device TL1 and the ATM switch 20, a virtual connection VC1 for transmitting packet-format ATM cells is set. Between the terminal device TL3 and the ATM switch 20, a virtual connection VC3 for transmitting non-packet-format ATM cells is set. Between the ATM switch 20 and the terminal device TL0, a virtual connection VC0 merging the virtual connection VC1 and VC3 is set. Using this virtual connection VC0, packet-format ATM cells and non-packet-format ATM cells are transmitted.

Assume that ATM cells arrive at the timing shown in FIG. 11 under the status of FIG. 10 in which virtual connections VC0, VC1, and VC3 are set. That is, as shown in FIG. 11, the ATM cell 1-1-1 first arrives at the ATM switch 20, using the virtual connection VC1, and the ATM cell 3-1 next arrives by using the virtual connection VC3. In this manner, sequentially, the ATM cell 1-1-2 arrives using the virtual connection VC1, and the ATM cell 3-2 arrived using the virtual connection VC3.

In the example of FIG. 11, the packet 1-1 transmitted through the virtual connection VC1 is composed of ATM cells 1-1-1 through 1-1-E whereas the packet 1-2 transmitted through the virtual connection VC1 is composed of ATM cells 1-2-1 through 1-2-E. The non-packet 3 transmitted through the virtual connection VC3 is composed of ATM cells 3-1 through 3-E.

Figure 12:
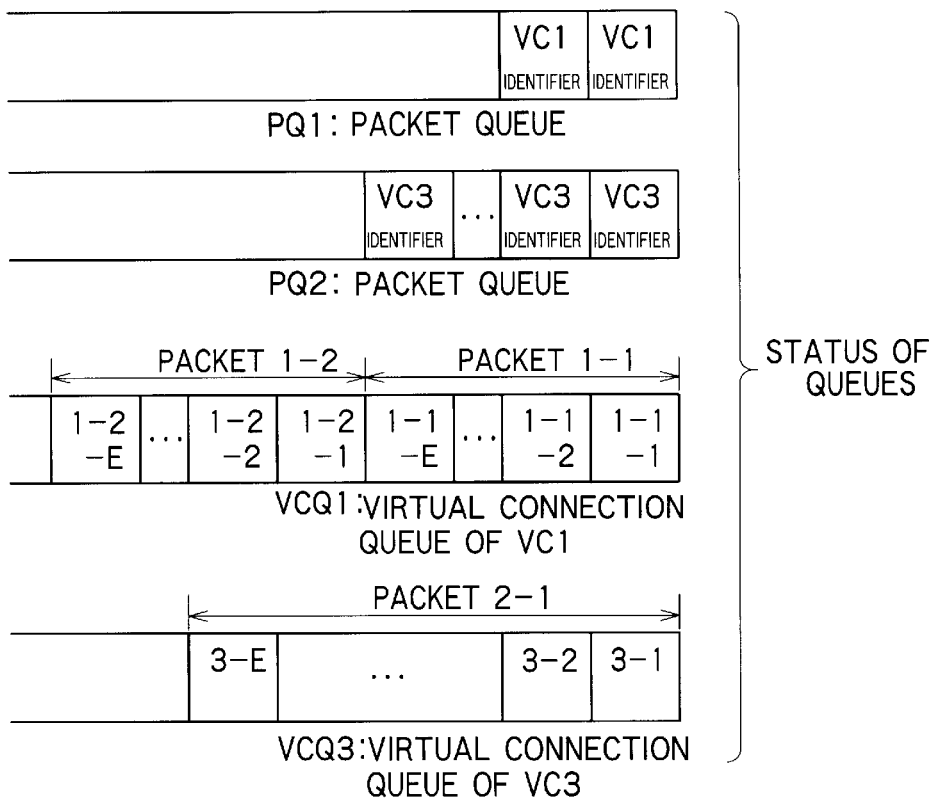
FIG. 12 is a diagram that shows processing of virtual connection queues and packet queues upon arrival of ATM cells at the timing shown in FIG. 11.
Figure 13:
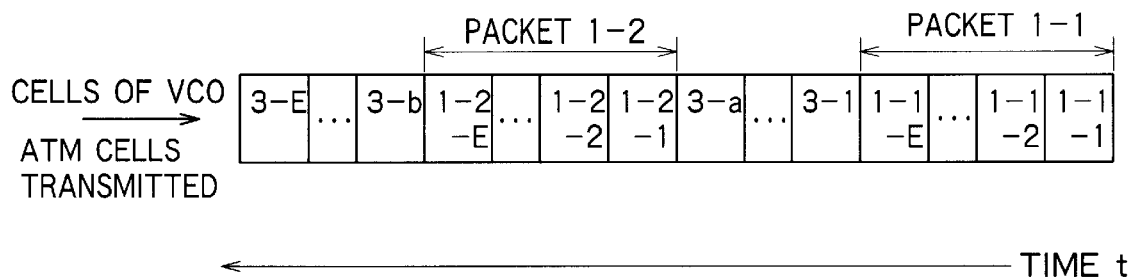
FIG. 13 is a diagram that shows a timing of ATM cells transmitted from a merged virtual connection.

When ATM cells arrive at the timing as shown in FIG. 11, processing as shown in FIGS. 12 and 13 is executed in the scheduler 26A.

FIG. 12 is a diagram that shows an aspect of storage and management of ATM cells conducted in the scheduler 26A upon arrival of ATM cells at the timing shown in FIG. 11. FIG. 13 is a diagram that shows a timing of ATM cells transmitted from the ATM switch 20.

Since the ATM cell 1-1-1 first arrives through the virtual connection VC1, this ATM cell 1-1-1 is stored in the virtual connection queue VCQ1. Next, since the ATM cell 3-1 arrives through the virtual connection VC3, this ATM cell 3-1 is stored in the virtual connection queue VCQ3. Since ATM cells sent through the virtual connection VC3 are of a non-packet type, at the time in arrival of the ATM cell 3-1, the identifier of the virtual connection VC3 is stored in the packet queue PQ2 having a lower priority.

Subsequently, since the ATM cell 1-1-2 arrives through the virtual connection VC1, this ATM cell 1-1-2 is stored in the virtual connection queue VCQ1. Next, since the ATM cell 3-2 arrives through the virtual connection VC3, this ATM cell 3-2 is stored in the virtual connection queue VCQ3. Here again, since the ATM cells sent through the virtual connection VC3 are of a non-packet type, the identifier of the virtual connection VC3 is stored in the packet queue PQ2 having a lower priority just after arrival of the ATM cell 3-2.

In this manner, arrived ATM cells are sequentially stored in the virtual connection queues VCQ1, VCQ3, respectively, and upon arrival of the final ATM cell 1-1-E of the packet 1-1 in the virtual connection VC1, this ATM cell 1-1-E is stored in the virtual connection queue VCQ1, and at the same time, the identifier of the virtual connection VC1 is stored in the packet queue PQ1 having the higher priority.

Consecutively, the next packet 1-2 is sent via the virtual connection VC1, and ATM cells, from the ATM cell 1-2-1, are sequentially stored in the virtual connection queue VCQ1.

Further, non-packet ATM cells sequentially arrive via the virtual connection VC3, and these ATM cells forming the non-packet 3 are stored in the virtual connection queue VCQ3. Simultaneously, the identifier of the virtual connection VC3 is stored in the packet queue PQ2. These proceedings are repeated.

Then, upon arrival of the final ATM cell 1-2-E of the packet 1-2 from the virtual connection VC1, this ATM cell 1-2-E is stored in the virtual connection queue VCQ1, and the identifier of the virtual connection VC1 is stored in the packet queue PQ1 with the higher priority.

ATM cells arriving as shown in FIG. 12 are stored and managed in the scheduler 26A, and they are sent by the virtual connection VC0 at the timing shown in FIG. 13.

That is, the scheduler 26A first scans the packet queue PQ1 with the higher priority. Since the packet queue PQ1 stores the identifier of the virtual connection VC1, the scheduler 26A extracts it.

Based on the extracted identifier, the scheduler 26A successively sends ATM cells of one packet from the virtual connection queue VCQ1 to the virtual connection VC0. That is, it sequentially sends ATM cells 1-1-1 through 1-1-E forming the packet 1-1 stored in the virtual connection queue VCQ1 in the virtual connection VC0 to an external line. ATM cells stored in the virtual connection queue VCQ1 are erased one after another immediately after being transmitted.

Upon completion of the sending of this packet, the identifier of the virtual connection VC1 in the storage in the forefront of the packet queue PQ1 is removed. However, the timing for removal of this identifier is not limited to that time. Instead, it may be the time at which the scheduler 26A extracts the identifier from the packet queue PQ1, for example.

Upon completion of the transmission of this packet, the scheduler 26A again scans the packet queue PQ1 having the higher priority first. At this point of time, however, the block of the packet 1-2 (ATM cells 1-2-E) does not yet reach the scheduler 26A, and the packet queue PQ1 is empty. Therefore, the scheduler 26A scans the packet queue PQ2 having the lower priority. The packet queue PQ2 stores a plurality of identifiers of the virtual connection VCQ3, which indicates arrival of non-packet-format ATM cells. Therefore, the scheduler 26A sends the ATM cell 3-1 in storage from the virtual connection queue VCQ3.

Upon completion of the transmission of the packet 3-1, the forefront identifier of the virtual connection VC3 stored in the packet queue PQ2 is removed. However, the timing for removal of this identifier is not limited to that time. Instead, it may be the time at which the scheduler 26A extracts the identifier from the packet queue PQ2, for example.

Subsequently, since the packet queue PQ1 having the higher priority is here again empty, the scheduler 26A sends the ATM cell 3-2 stored in the virtual connection queue VCQ3 in accordance with the packet queue PQ2 having the lower priority, and removes the identifier from the packet queue PQ2. In this manner, the scheduler 26A sequentially sends out non-packet ATM cells stored in the virtual connection queue VCQ3 through the virtual connection VC0.

While processing for transmitting ATM cells not forming packet is repeated in this manner, at the time of the transmission of the ATM cell 3-a, the identifier of the virtual connection VC1 is stored in the packet queue PQ1. Therefore, the scheduler 26A extracts the identifier of the virtual connection VC1 stored in the packet queue PQ1. Then, it sequentially extracts ATM cells 1-2-1 through 1-2-E forming the packet 1-2 in the virtual connection queue VCQ1, and successively sends out them by the virtual connection VC0.

That is, in the example of FIGS. 11 through 13, the packet-format packet 1-2 results in interrupting the transmission of the non-packet ATM cells 3 and being preferentially sent as one block.

Upon the sending of the packet 1-2-E, the scheduler 26A first scans the packet queue PQ1 having the higher priority. However, since the packet queue PQ1 is empty, it next scans the packet queue PQ2 having the lower priority. Since this packet queue PQ2 stores the identifier of the virtual connection VC3, the scheduler 26A extracts it. Then, it extracts the ATM cell 3-b from the virtual connection queue VCQ3 and transmits it by the virtual connection VC0. By repeating these proceedings, the scheduler 26A sends ATM cells up to the ATM cell 3-E using the virtual connection VC0.

As explained above, according to the ATM switch 20 of this embodiment, ATM cells are scheduled and controlled in the unit of each packet similarly to the foregoing embodiments. Therefore, even when the virtual connection VC1 and the virtual connection VC3 are merged as the virtual connection VC0, ATM cells are prevented from mixing up between different packets.

Additionally, even when there are both the virtual connection VC1 transmitting the packet-format ATM cells and the virtual connection VC3 transmitting the non-packet-format ATM cells, scheduling as an ordinary ATM switch 20 is possible. That is, for the virtual connection VC1 transmitting the packet-format ATM cells, by storing the identifier in the virtual connection VC1 in the packet queue PQ1 in the unit of each packet, and for the virtual connection VC3 transmitting the non-packet-format ATM cells, by storing the identifier of the virtual connection VC3 in the packet queue PQ2 in the unit of each ATM cell, ATM cells to be sent can be scheduled efficiently even when there are both the packet-format virtual connection VC1 and the non-packet-format virtual connection VC3.

Moreover, this embodiment prepares a plurality of packet queues PQ1, PQ2 different in priority for each output port 28 so as to store the identifier of the packet-format virtual connection VC1 in the packet queue PQ1 having the higher priority and store the identifier of the non-packet-format virtual connection VC3 in the packet queue PQ2 having the lower priority. Therefore, packet-format ATM cells can be sent preferentially to non-packet-format ATM cells.

In the embodiment shown here, the scheduler 26A employs a strict priority system as its scheduling algorithm. However, the algorithm is not limited to this. For example, a system like weighted round robin can be also employed as the scheduling algorithm similarly to the second embodiment. Alternatively, identifiers in storage maybe extracted alternately from the packet queues PQ1 and PQ2.

Furthermore, although this embodiment is configured to store the identifier of the virtual connection VC3 transferring non-packet-format ATM cells in the packet queue PQ2 having the lower priority, the embodiment may be modified to store the identifier in the packet queue PQ1 having the higher priority. The packet queue PQ1 or PQ2 for storing the identifiers may be determined in accordance with the priority of the virtual connection VCx transferring non-packet-format ATM cells.

(Fourth Embodiment)

The fourth embodiment of the invention is a version modified from the third embodiment to provide only one packet queue and store identifiers of both packet-format ATM cells and non-packet-format ATM cells in this packet queue.

The scheduler 26 in the embodiment shown here is the same as that of the first embodiment shown in FIG. 3. Therefore, its details are not explained here. Further, assume here that virtual connections VC0, VC1, VC3 are set in the ATM network 10 similarly to the third embodiment shown in FIG. 10 and that ATM cells arrive at the timing shown in FIG. 11.

Figure 14:
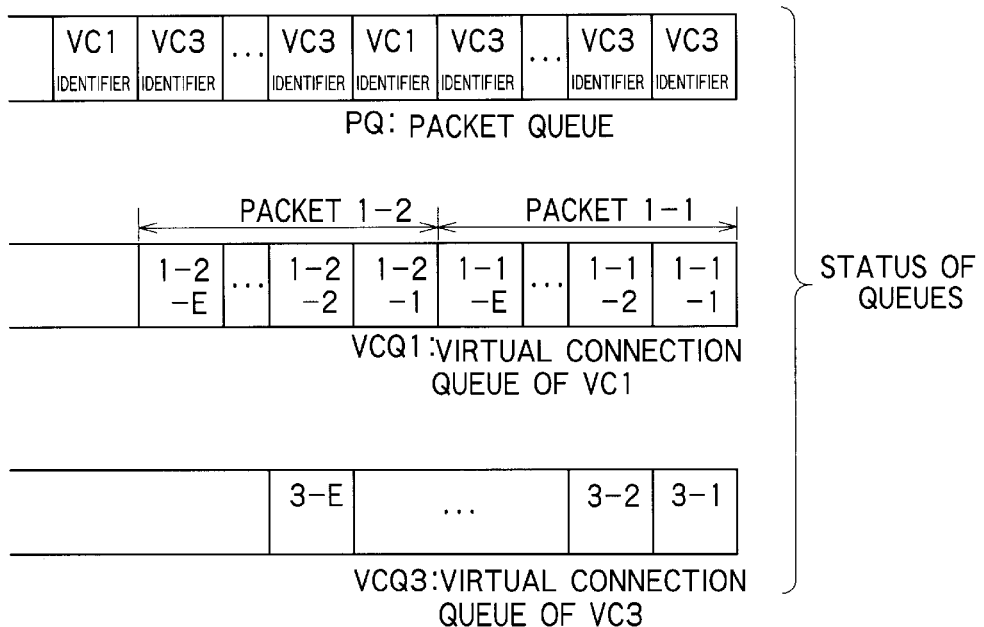
FIG. 14 is a diagram that shows processing of virtual connection queues and packet queues according to the fourth embodiment of the invention.
Figure 15:
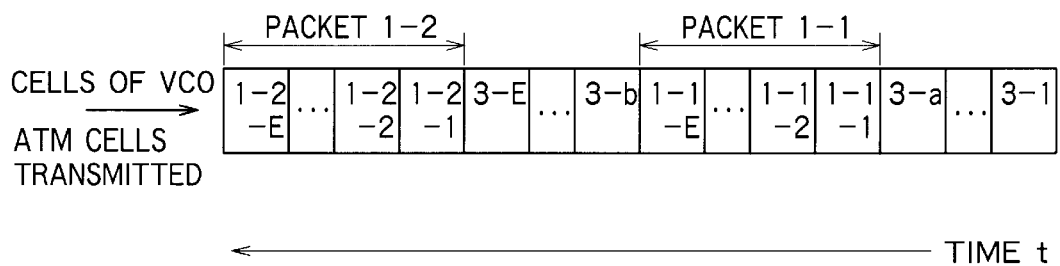
FIG. 15 is a diagram that shows a timing of ATM cells transmitted from a merged virtual connection.

When ATM cells arrive at the timing as shown in FIG. 11, processing as shown in FIGS. 14 and 15 is executed in the scheduler 26.

FIG. 14 is a diagram that shows an aspect of storage and management of ATM cells conducted in the scheduler 26 upon arrival of ATM cells at the timing shown in FIG. 11. FIG. 15 is a diagram that shows a timing of ATM cells transmitted from the ATM switch 20.

Since the ATM cell 1-1-1 first arrives through the virtual connection VC1, this ATM cell 1-1-1 is stored in the virtual connection queue VCQ1. Next, since the ATM cell 3-1 arrives through the virtual connection VC3, this ATM cell 3-1 is stored in the virtual connection queue VCQ3. Since ATM cells sent from the virtual connection VC3 are of a non-packet type, at the time of arrival of the ATM cell 3-1, the identifier of the virtual connection VC3 is stored in the packet queue PQ.

Subsequently, since the ATM cell 1-1-2 arrives through the virtual connection VC1, this ATM cell 1-1-2 is stored in the virtual connection queue VCQ1. Next, since the ATM cell 3-2 arrives through the virtual connection VC3, this ATM cell 3-2 is stored in the virtual connection queue VCQ3. Here again, since the ATM cell sent from the virtual connection VC3 has a non-packet form, the identifier of the virtual connection VC3 is stored in the packet queue PQ just after arrival of the ATM cell 3-2.

In this manner, arrived ATM cells are sequentially stored in the virtual connection queues VCQ1, VCQ3, and upon arrival of the final ATM cell 1-1-E of the packet 1-1 from the virtual connection VC1, this ATM cell 1-1-E is stored in the virtual connection queue VCQ1, and at the same time, the identifier of the virtual connection VC1 is stored in the packet queue PQ.

Consecutively, the next packet 1-2 is sent from the virtual connection VC1, and ATM cells, from the ATM cell 1-2-1, are sequentially stored in the virtual connection queue VCQ1.

Further, non-packet ATM cells sequentially arrive from the virtual connection VC3, and these ATM cells forming the non-packet 3 are stored in the virtual connection queue VCQ3. Simultaneously, the identifier of the virtual connection VC3 is stored in the packet queue PQ. These proceedings are repeated.

Upon arrival of the final ATM cell 1-2-E of the packet 1-2 from the virtual connection VC1, this ATM cell 1-2-E is stored in the virtual connection queue VCQ1, and the identifier of the virtual connection VC1 is stored in the packet queue PQ.

ATM cells arrived as shown in FIG. 14 are stored and managed in the scheduler 26, and they are transmitted from the virtual connection VC0 at the timing shown in FIG. 15.

That is, the scheduler 26 scans the packet queue PQ. Since the packet queue PQ stores the identifier of the virtual connection VC1, the scheduler 26 extracts it.

Based on the extracted identifier, the scheduler 26 sends out the ATM cell 3-1 stored in the virtual connection queue VCQ3 in the virtual connection VC0. Upon completion of the transmission of this packet 3-1, the scheduler 26 removes the forefront identifier of the virtual connection VC3 stored in the packet queue PQ. However, the timing for removal of this identifier is not limited to that time. Instead, it may be the time at which the scheduler 26 extracts the identifier from the packet queue PQ, for example. In this manner, the scheduler 26 scans the packet queue PQ, and based on that, it sequentially sends ATM cells in the virtual connection VC0.

After sending the ATM cell 3-a in the virtual connection VC0, the scheduler scans the packet queue PQ. Since this packet queue PQ stores the identifier of the virtual connection VC1, the scheduler 26 extracts it. Then, based on the extracted identifier, the scheduler 26 successively transmits ATM cells of one packet in the virtual connection queue VCQ1 by the virtual connection VC0. That is, it sequentially transmits ATM cells 1-1-1 through 1-1-E forming the packet 1-1 stored in the virtual connection queue VCQ1 from the virtual connection VC0 to an external line. ATM cells stored in the virtual connection queue VCQ1 are erased one after another immediately after being transmitted.

Upon completion of the transmission of this packet, the identifier of the forefront virtual connection VC1 in the storage of the packet queue PQ is removed. However, the timing for removal of this identifier is not limited to that time. Instead, it may be the time at which the scheduler 26 extracts the identifier from the packet queue PQ, for example.

Upon completion of the transmission of this packet 1-1, the scheduler 26 again scans the packet queue PQ. Then, it extracts the identifier of the virtual connection VCQ3 from the packet queue PQ, and sends the ATM cell 3-b stored in the virtual connection queue VCQ3 in the virtual connection VC0. The scheduler 26 repeats this processing.

After sending the ATM cell 3-E in the virtual connection VC0, the scheduler scans the packet queue PQ. Since the identifier of the virtual connection VC1 is stored in the packet queue PQ, the scheduler 26 extracts it. Based on the extracted identifier, the scheduler 26 successively sends ATM cells of one packet in the virtual connection queue VCQ1 by the virtual connection VC0. That is, it sequentially sends ATM cells 1-2-1 through 1-2-E forming the packet 1-2 stored in the virtual connection queue VCQ1 from the virtual connection VC0 to an external line. ATM cells stored in the virtual connection queue VCQ1 are erased one after another immediately after being dispatched.

That is, in the example of FIGS. 14 and 15, the packet-format packet 1-1 results in interrupting during the course of transmission of the non-packet ATM cells 3 and being transmitted as a block.

As explained above, according to the ATM switch 20 of this embodiment, ATM cells are scheduled and controlled in the unit of each packet similarly to the foregoing embodiments. Therefore, even when the virtual connection VC1 and the virtual connection VC3 are merged as the virtual connection VC0, ATM cells are prevented from mixing up between different packets.

Further, like the third embodiment already explained, even when there are both the packet-format virtual connection VC1 and the non-packet-format virtual connection VC3, packet-format ATM cells and non-packet ATM cells can be sent by the virtual connection VC0 without being mixed with each other.

(Fifth Embodiment)

The fifth embodiment of the invention is directed to a version modified from the second embodiment so that, even when a plurality of virtual connections are set from a certain ATM switch to a common terminal device, a part of virtual connections are not merged, and an independent virtual connection is set. In that case, the fifth embodiment is configured to efficiently schedule the transmission of packet-format ATM cells by utilizing that ATM cells of different virtual connections, even when mixed up, can be rearranged into packets in a terminal device at the destination.

The scheduler 26A in the embodiment shown here is the same as that of the second embodiment shown in FIG. 7. Therefore, its details are not explained here.

Further, assume here that virtual connections VC0, VC1, VC2, VC4 are set in the ATM network 10 as shown in FIG.

16. That is, destination of communication from terminal devices TL1, TL2, TL4 is commonly the terminal device TL0. Between the terminal device TL1 and the ATM switch 20, the virtual connection VC1 is set for transmitting packet-format ATM cells. Between the terminal device TL2 and the ATM switch 20, the virtual connection VC2 is set for transmitting packet-format ATM cells. Between the terminal device TL4 and the ATM switch 20, the virtual connection VC4 is set for transmitting packet-format ATM cells.

Between the ATM switch 20 and the terminal device TL0, the virtual connection VC0 merged the virtual connections VC1 and VC2, and the virtual connection VC4 not merged are set. However, the virtual connections VC0 and VC4 are a common output line output from a common output port 28 in hardware.

Figure 17:
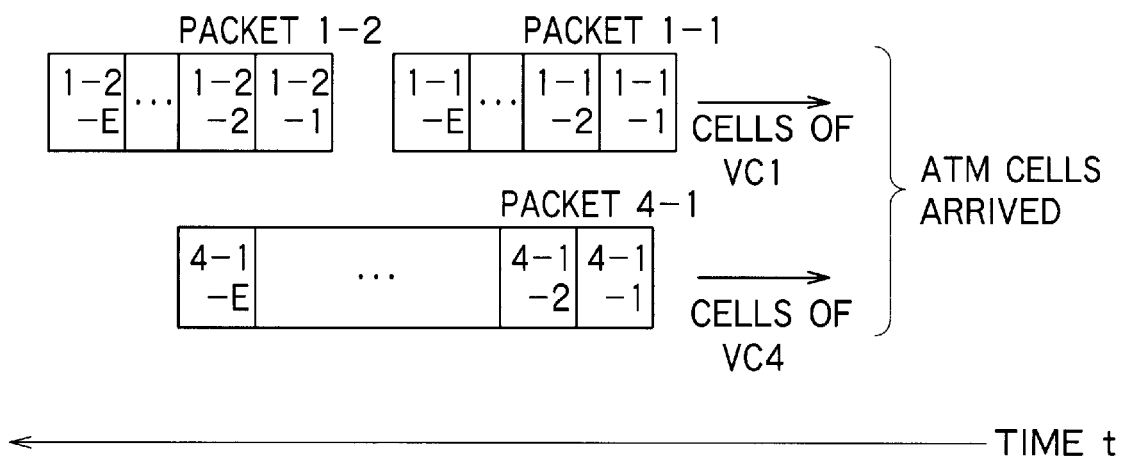
FIG. 17 is a diagram that shows a timing of arrival of ATM cells, which form packets, used as an example in the explanation of behaviors of the ATM switch according to the fifth embodiment of the invention.

Assume here that ATM cells arrive at the timing shown in FIG. 17 under the condition of FIG. 16 where the virtual connections VC0, VC1, VC2 and VC4 are set. For simplicity, assume that no ATM cells are transmitted from the virtual connection VC2.

As shown in FIG. 17, the ATM cell 1-1-1 first arrives at the ATM switch 20, using the virtual connection VC1, and the ATM cell 4-1-1 next arrives by using the virtual connection VC4. In this manner, ATM cells sequentially arrive through the virtual connections VC1 and VC4.

In the example of FIG. 17, the packet 1-1 transmitted through the virtual connection VC1 is composed of ATM cells 1-1-1 through 1-1-E whereas the packet 1-2 transmitted through the virtual connection VC1 is composed of ATM cells 1-2-1 through 1-2-E. The packet 4-1 transmitted through the virtual connection VC4 is composed of ATM cells 4-1-1 through 4-1-E.

Figure 18:
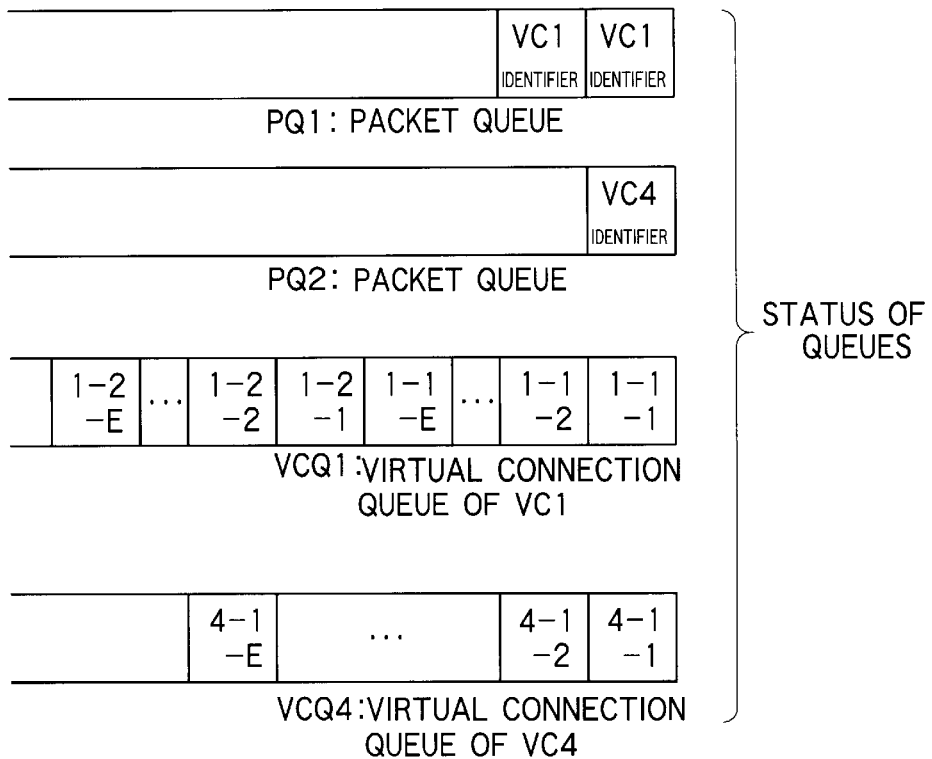
FIG. 18 is a diagram that shows processing of the virtual connection queues and the packet queue upon arrival of ATM cells at the timing shown in FIG. 17.
Figure 19:
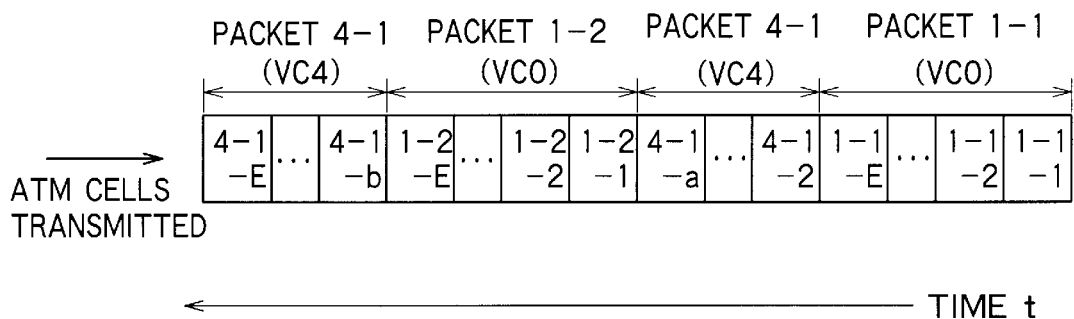
FIG. 19 is a diagram that shows a timing of ATM cells transmitted from a merged virtual connection.

When ATM cells arrive at the timing as shown in FIG. 17, processing as shown in FIGS. 18 and 19 is executed in the scheduler 26A.

FIG. 18 is a diagram that shows an aspect of storage and management of ATM cells conducted in the scheduler 26A upon arrival of ATM cells at the timing shown in FIG. 17. FIG. 19 is a diagram that shows a timing of ATM cells dispatched from the ATM switch 20.

Since the ATM cell 1-1-1 first arrives through the virtual connection VC1, this ATM cell 1-1-1 is stored in the virtual connection queue VCQ1. Next, since the ATM cell 4-1-1 arrives through the virtual connection VC4, this ATM cell 4-1-1 is stored in the virtual connection queue VCQ4. Since the ATM cell 1-1-2 next arrives through the virtual connection VC1, this ATM cell 1-1-2 is stored in the virtual connection queue VCQ1. In this manner, arriving ATM cells are classified into the virtual connections VC1, VC4, and stored in the virtual connection queues VCQ1 and VCQ4, respectively.

In this manner, ATM cells that sequentially arrive are accumulated progressively, and upon arrival of the final ATM cell 1-1-E of the packet 1-1 in the virtual connection VC1, this ATM cell 1-1-E is stored in the virtual connection queue VCQ1, and the identifier of the virtual connection VC1 is simultaneously stored in the packet queue PQ1 having a higher priority.

Subsequently, the next packet 1-2, from the ATM cell 1-2-1, is transmitted in the virtual connection VC1, and ATM cells are sequentially stored in the virtual connection queue VCQ1.

Further, upon arrival of the final ATM cell 4-1-E of the packet 4-1 in the virtual connection VC4, this ATM cell 4-1-E is stored in the virtual connection queue VCQ4, and the identifier of the virtual connection VC4 is simultaneously stored in the packet queue PQ2 having a lower priority.

At the time of arrival of the final ATM cell 1-2-E of the packet 1-2 in the virtual connection VC1, the ATM cell 1-2-E is stored in the virtual connection queue VCQ1, and at the same time, the identifier of the virtual connection VC1 is stored in the packet queue PQ1 having the higher priority.

As shown in FIG. 18, ATM cells are stored and managed by the scheduler 26A, and they are transmitted from a common output port 28 at the timing shown in FIG. 19 by using the virtual connections VC0 and VC4.

That is, the scheduler 26A first scans the packet queue PQ1 with the higher priority. Since the packet queue PQ1 stores the identifier of the virtual connection VC1, the scheduler 26A extracts it.

Based on the extracted identifier, the scheduler 26A successively sends ATM cells of one packet in the virtual connection queue VCQ1 by the virtual connection VC0. That is, it sequentially sends ATM cells 1-1-1 through 1-1-E forming the packet 1-1 stored in the virtual connection queue VCQ1 from the virtual connection VC0 to an external line. ATM cells stored in the virtual connection queue VCQ1 are erased one after another immediately after being dispatched.

Upon completion of the transmission of this packet, the forefront identifier of the virtual connection VC1 in the storage of the packet queue PQ1 is removed. However, the timing for removal of this identifier is not limited to that time. Instead, in case of the packet queue PQ1, it may be the time at which the scheduler 26A extracts the identifier from the packet queue PQ1, for example. As to the packet queue PQ2 having the lower priority, however, since an interrupt may occur during the transmission of a packet, it is necessary to hold the identifier in the packet queue PQ2 before the final ATM cell of the packet is transmitted.

Upon completion of the transmission of this packet 1-1, the scheduler 26A scans the packet queue PQ1 having the higher priority. However, this packet queue PQ1 is empty. Therefore, according to the packet queue PQ2 having the lower priority, the scheduler 26A sends the ATM cell 4-1-1 stored in the virtual connection queue VCQ4 through the virtual connection VC4. Upon the sending of the ATM cell by the virtual connection queue VCQ4 having the lower priority, the scheduler 26A scans the packet queues PQ1, PQ2 every time upon sending one ATM cell. Then, after confirming that the packet queue PQ1 is empty, it sends the ATM cell stored in the virtual connection queue VCQ4 according to the packet queue PQ2.

In this manner, the scheduler 26A acts to sequentially transmit ATM cells of the packet 4-1 stored in the virtual connection queue VCQ4 by using the virtual connection VC4.

However, upon sending the ATM cell 4-1-$a$, the identifier of the virtual connection VC1 is stored in the packet queue PQ1 having the higher priority. Therefore, the scheduler 26A extracts the identifier of the virtual connection VC1 stored in the packet queue PQ1. Then, it successively extracts ATM cells 1-2-1 through 1-2-E forming the packet 1-2 in the virtual connection queue VCQ1, and sends them successively in the virtual connection VC0.

That is, in the example of FIGS. 17 through 19, the packet 1-2 results in interrupting the transmission of the packet 4-1 and being preferentially transmitted as one block.

Upon the transmission of the packet 1-2-E, the scheduler 26A first scans the packet queue PQ1 having the higher priority. However, since the packet queue PQ1 is empty, it next scans the packet queue PQ2 having the lower priority. Since this packet queue PQ2 stored the identifier of the virtual connection VC4. That is, as to the packet queue PQ2 having the lower priority, the identifier is not erased before the final ATM cell of the packet is dispatched. Therefore, the scheduler 26A extracts this identifier from the packet queue PQ2. Then, it extracts the ATM cell 4-1-*b* from the virtual connection queue VCQ4 identified by that identifier, and sends it through the virtual connection VC4. Thereafter, the scheduler 26A repeats the same processing until sending the ATM cell 4-1-E from the virtual connection VC4.

As explained above, according to the ATM switch 20 of this embodiment, ATM cells are scheduled and controlled in the unit of each packet similarly to the foregoing embodiments. Therefore, even when the virtual connection VC1 and the virtual connection VC3 are merged as the virtual connection VC0 while the virtual connection VC4 is set independently, ATM cells are prevented from mixing up between different packets.

More specifically, by scanning a plurality of packet queues PQ1, PQ2 every time when sending each ATM cell and re-scheduling, the scheduler 26A can send ATM cells while permitting mixture of ATM cells forming a packet between the virtual connections VC1 and VC4 which are not merged together. This is because ATM cells in different virtual connections can be discriminated on the part of a terminal device TL0 that receives them, and a packet can be re-arranged from mixed ATM cells.

In contrast, in the virtual connections VC1, VC2, since ATM cells are sent to the terminal device TL0 through a common virtual connection VC0, if ATM cells mix up, the terminal device TL0 that receives them cannot re-construct a packet properly. Therefore, in the virtual connections VC1, VC2, transmission is scheduled in the unit of each packet so as to prevent mixture of ATM cells forming a packet.

Moreover, this embodiment prepares a plurality of packet queues PQ1, PQ2 different in priority for each output port 28 so as to store the identifier of the virtual connection VC1 in the packet queue PQ1 having the higher priority and store the identifier of the virtual connection VC4 in the packet queue PQ2 having the lower priority. Therefore, the packet of the virtual connection VC1 can be transmitted preferentially to the packet of the virtual connection VC4.

In the embodiment shown here, the scheduler 26A employs a strict priority system as its scheduling algorithm. However, the algorithm is not limited to this. For example, a system like weighted round robin can be also employed as the scheduling algorithm similarly to the second embodiment. Alternatively, identifiers in storage may be extracted alternately from the packet queues PQ1 and PQ2.

The invention is not limited to the above-explained embodiments, but may be changed or modified in various modes. For example, in the second, third and fifth embodiments, the number of packet queues PQ1, PQ2 having different priorities is not limited to only two, but three, four or more packet queues may be provided. Further, in accordance with the ATM service categories (CBR, rt-VBR, nrt-VBR, UBR, ABR), five packet queues different in priority may be provided.

The foregoing embodiments have been explained as providing virtual connection queues VCQx and packet queues PQx in the scheduler 26. However, these virtual connection queues VCQx and packet queues PQx may be provided in the buffer 24.

Any of the foregoing embodiments has been explained as merging virtual connections VCx. In this explanation, however, virtual connections VCx should be construed as involving virtual passes and virtual channels as well.

As described above, according to the invention, since ATM cells are prevented from mixing between those of different forms of packets even when packet-format ATM cells are transmitted through a merged virtual connection in a system where an ATM switch has the function of merging virtual connections, address space of virtual connections in an ATM network can be used effectively.

What is claimed is:

1. An ATM switch transmitting ATM cells arrived through a plurality of different virtual connections by merging them into a single virtual connection, comprising:

virtual connection queues which store the ATM cells classified according to the individual virtual connections;

one or more packet queues which store an identifier of the virtual connection used for the transmission of the ATM cells for forming a packet, when a final ATM cell of the packet arrives; and a scheduler configured to scan the packet queues, extract one identifier from the packet queue storing the identifiers, select one of the virtual connection queues to be next transmitted in accordance with the identifier extracted from the packet queue, and successively transmit ATM cells in a unit of packet from the virtual connection queue selected, wherein a first packet queue and a second packet queue which has a lower priority than the first packet queue are provided as the packet queues, and wherein, when an ATM cell having been transmitted through a virtual connection identified by an identifier stored in the first packet queue and an ATM cell having been transmitted through a virtual connection identified by an identifier stored in the second packet queue are to be transmitted through different virtual connections, even during the transmission of a packet of the ATM cells in the virtual connection queue identified by the identifier stored in the second packet queue, the scheduler interrupts the transmission of the packet of the ATM cells in the virtual connection queue identified by the identifier stored in the second packet queue and starts the transmission of the ATM cells in the virtual connection queue identified by the identifier stored in the first packet queue.

2. The ATM switch according to claim 1 wherein the scheduler scans the first and second packet queues upon every transmission of one or more of the ATM cells.

3. The ATM switch according to claim 2 wherein, when the scheduler has interrupted the transmission of the ATM cells in the virtual connection queue identified by the identifier stored in the second packet queue and has started the transmission of the ATM cells in the virtual connection queue identified by the identifier stored in the first packet queue, the scheduler resumes the transmission of the ATM cells in the virtual connection queue identified by the identifier stored in the second packet queue, after the transmission of the ATM cells of the packet of the virtual connection identified by the identifier stored in the first packet queue is completed.

4. The ATM switch according to claim 3 wherein, after the final one of the ATM cells for forming the packet is transmitted, the scheduler removes the identifier of the virtual connection, through which the packet has been transmitted, from the second packet queue.

* * * * *